UNITED STATES PATENT OFFICE.

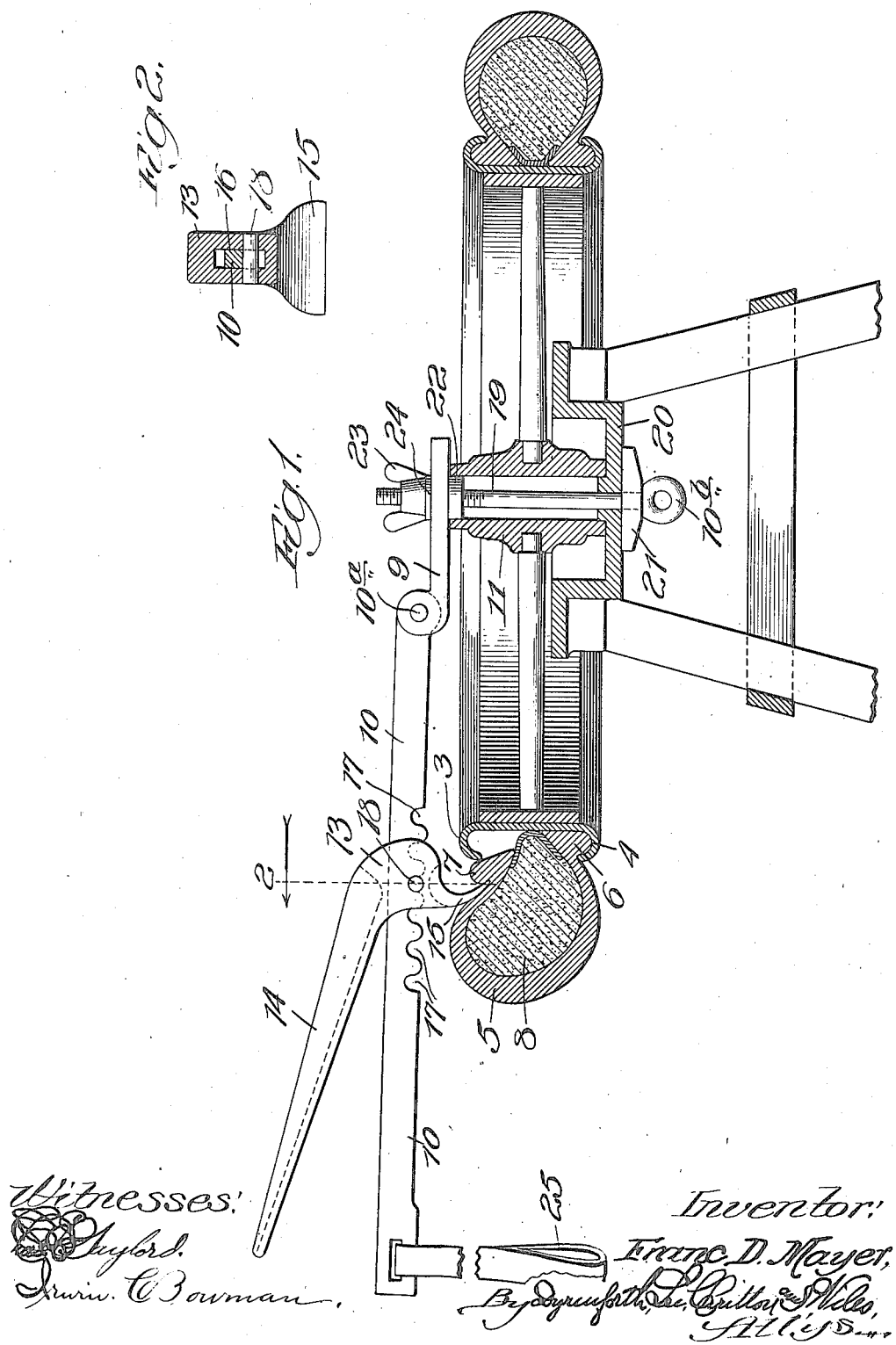

FRANC D. MAYER, OF CHICAGO, ILLINOIS.

TIRE-ADJUSTING APPARATUS.

1,208,184.  Specification of Letters Patent.  Patented Dec. 12, 1916.

Application filed June 22, 1914. Serial No. 846,530.

*To all whom it may concern:*

Be it known that I, FRANC D. MAYER, a citizen of the United States, residing at Chicago, in the county of Cook and State of Illinois, have invented a new and useful Improvement in Tire-Adjusting Apparatus, of which the following is a specification.

My invention relates to apparatus for use either in applying tires to clencher-rims of wheels, or removing them therefrom, or both.

The application to clencher-rims, of all kinds of tires which involve in their application to the rim, the compressing of the tire, to interlock the tire with the rim, as, for example, solid tires, tires having a resilient core or filler, or tires preliminarily inflated with air, has hitherto been rendered very difficult owing to the fact that there has not been heretofore provided means suitable for readily forcing the unengaged annular bead on the tire into the coöperating flange of the clencher-rim, after the other bead of the tire has been interlocked with its coöperating clencher-rim flange.

My object is to provide means by the use of which tires of the character stated may be readily and quickly applied to clencher-rims, and removed therefrom when desired without danger of injury to the tire.

Referring to the accompanying drawing—Figure 1 is a view in sectional elevation of a wheel-stand, with a wheel, shown in section, and having a clencher-rim, supported on the stand in a desirable position for having applied thereto, by my improved means shown in elevation and in position on the wheel, a tire shown in section and of a type having a core formed of sections of resilient material, the tire at one side of the wheel being shown as secured in full interlocking position on the rim and at the other side in a position it assumes while being applied thereto by my improved means; and Fig. 2, a section taken at the line 2 on Fig. 1 and viewed in the direction of the arrow.

I have devised my improved means for use, more particularly, in the application to, or the removal from, wheels of the clencher-rim type, such as for example, that illustrated wherein neither of the clenching-flanges, shown at 3 and 4, is movable relative to the other, of tires of the type involving an outer casing, represented at 5, having annular beads or flanges 6 and 7, respectively, at its opposite edges, with a filler, or core, 8 formed of cylindrical sections of any suitable resilient solid material, such as the product generally known as "Essenkay" tire-filler which are introduced into the casing through its open side to abut in endwise relation, before the tire is applied to the rim, the sections forming the core filling the casing 5 to such an extent that they become compressed upon the act of interlocking the bead 7 with the flange 3, though it may be used to advantage wherever the resistance afforded by the tire in the operation of applying it to a clencher-rim is sufficient to make the use of my improved means desirable.

My improved means, in the preferred form shown, comprises a bearing-bar formed of sections 9 and 10 pivoted together as shown at $10^a$, the section 9 being adapted to be supported, preferably pivotally, as hereinafter described at the hub 11 of the wheel, and a tool in the form of a lever 13 fulcrumed on the bar-section 10 and provided at one end with an operating handle 14 and at its opposite end with a projection, or tooth, 15 adapted to engage the bead 7 on the tire.

The lever 14 is preferably slotted, as indicated at 16, the bar-section 10 extending through this slot, and being provided on an edge with a series of notches 17 adapted to be engaged by a pin 18 on the lever 13 and extending through the slot 16.

The bar-section 9 is preferably journaled on a bolt 19 confined on the hub of the wheel by any suitable means, a description of those shown being as follows: The bolt 19, which is screw-threaded at its upper end passes upwardly through a depressed portion of the top 20 of a stand for the wheel to which the tire is to be applied, and upwardly through the hub 11 of the wheel, as represented, a block 21 on the bolt above the headed-end $10^b$ thereof, bearing against the underside of the stand top 20. The bolt 19 passes through the bar-section 9, which is preferably provided with a centering-boss 22 on its underside fitting into the hub 11 of the wheel, and screwed upon the upper end of the bolt, above the bar-section 9, is a nut 23, with a washer 24 interposed between the latter and the bar, the construction thus provided forming a clamp for the bar-section 9, serving to firmly hold it against tipping, but permitting it to be swung around the bolt 19, as a pivot, for the purpose hereinafter explained.

The manner of using the preferred illustrated embodiment of my invention to apply a tire to a wheel is as follows: The wheel is applied to the stand to the position shown in Fig. 1 and the bar 9 mounted on the hub 11 of the wheel, as shown, and by the means described, to cause the bar formed of the sections 9 and 10 to extend in a radial direction from the hub 11 as illustrated, the casing 5 having been previously interlocked at its bead 6 with the flange 4 of the clencher-rim, or thereafter applied to this position on the rim after the bar 9 is applied to the hub as stated. The operator then adjusts the lever 13 along the bar-section 10 to cause the pin 18 to enter the one of the notches 17 which will furnish the desired fulcrum point for the lever 13 for causing the bead 7 to be forced, against the resistance of the core 8 to compression, under and into interlocking engagement with the flange 3 of the rim by the engagement of the tooth 15 with the bead 7, as shown in Fig. 1, when the lever is rocked downwardly at its left-hand end in Fig. 1. A stirrup 25 is preferably provided at the outer end of the bar-section 10 to permit the operator, by engaging his foot with the stirrup, to force the bar-section 10 downwardly to compress the tire, by the engagement of the tooth 15 therewith, and carry the bead 7 to a position in which it may be moved under, and into interlocking engagement with, the flange 3, by operating the lever 13.

It will be understood from the foregoing that by constructing tire-adjusting apparatus in accordance with my invention, sufficient leverage may be exerted against the tire at the bead 7 to cause this bead to be carried under and into interlocking engagement with the clencher-flange 3 in opposition to the resistance afforded by the core 8 against compression, and that the operation, as stated, may be readily and quickly performed.

The pivoting of the bar 9 to the hub of the wheel permits the operator to readily position the tire-engaging portion of the tool at desired points in succession around the tire to force the bead 7 throughout its length, by successive operations, into interlocking engagement with the clencher-flange 3.

In using the apparatus for removing a tire from the wheel, the lever 13 is removed by sliding it off the end of the bar 9 and applying it to the latter in the reverse position (not shown) to cause the tooth 15 to extend below the plane of the bar 9, but extend toward the left in Fig. 1 instead of to the right, as shown in this figure, the handle-portion 14 of the lever, when the latter is thus reversed, extending to the right in Fig. 1 instead of to the left, the pin 18 engaging with one of the notches 17 to form a fulcrum for the lever. Bearing down on the bar-section 10 and swinging the lever 13 downwardly at its handle-portion, thus causes the tire to be compressed and carries the bead 7 out of interlocking engagement with the clencher-flange 3.

While I have illustrated and described a particular construction embodying my invention, I do not wish to be understood as intending to limit it thereto as the same may be variously modified and altered without departing from the spirit of my invention.

What I claim as new and deside to secure by Letters Patent is—

1. A device of the character described, comprising a bearing bar formed in sections hingedly connected together, one of said sections being pivotally supported adjacent the hub portion of a wheel, said other section having a plurality of rounded recesses, and a lever fulcrumed on said second mentioned section in any one of said recesses and provided at one end with a handle and at its other end with a tire bead engaging portion of a shape adapted to press one side of the tire toward the opposite side and then carry it toward the rim.

2. A device of the character described comprising a bearing member adapted to be firmly held at a point adjacent the hub portion of a wheel and extending in a radial direction therefrom, a member hingedly connected with said bearing member extending to a point beyond the periphery of the wheel, and a removable lever having an opening through which said section passes provided with an operating handle at one end and a tire bead engaging tool at its other of a shape adapted to press one side of the tire toward the opposite side and then carry it toward the rim.

3. A device of the character described comprising a bearing member projecting radially with respect to the central part of a wheel, a second member fulcrumed on said bearing member having a plurality of notches, a lever reversibly and removably mounted upon said second member having an operating handle and a tire bead engaging portion adapted to force said bead into or out of interlocking position according to the position of the lever upon said second mentioned member.

4. A device of the character described, comprising a movable member having one end relatively fixed and having a series of notches along its lower edge, a lever having an opening through its central part adapted to be slipped over said member in either direction, and having a fulcrum pin adapted to be received in any one of said notches, said lever being provided with an operating handle and a tire bead engaging member adapted to urge said tire into or out of interlocking position with respect to the rim of a wheel.

5. A device of the character described, comprising a bearing bar formed in sections hingedly connected together, means adapted to pivotally support said member at one section on the hub-portion of a wheel, and a lever fulcrumed on the other of said sections and provided at one end with a handle and at its other end with a tire-bead-engaging portion.

6. A device of the character described, comprising a bearing member adapted to be mounted on the hub of a wheel to extend in a radial direction therefrom, and be turned about the hub as an axis and moved toward a side of the rim, and a tire-bead-engaging tool provided with an operating handle and coöperating with said bearing member and movable thereon, for the purpose set forth.

FRANC D. MAYER.

In presence of—
  D. C. THORSEN,
  O. C. AVISUS.